United States Patent
Wilson et al.

[11] Patent Number: 5,951,090
[45] Date of Patent: Sep. 14, 1999

[54] SUN VISOR WITH RETRACTABLE ARTICLE-HOLDING ASSEMBLY

[75] Inventors: Douglas J. Wilson, Burtchville; Donald M. Peterson, West Bloomfield, both of Mich.

[73] Assignee: Lear Corporation, Southfield, Mich.

[21] Appl. No.: 09/039,029

[22] Filed: Mar. 13, 1998

[51] Int. Cl.$^6$ ........................................... B60J 3/00
[52] U.S. Cl. .......................... 296/97.5; 296/97.1; 224/312
[58] Field of Search .................................. 296/97.5, 97.1; 224/312

[56] References Cited

U.S. PATENT DOCUMENTS

| | | | |
|---|---|---|---|
| 2,517,337 | 8/1950 | Nodle | 224/312 |
| 2,707,072 | 4/1955 | Sims | 224/312 |
| 2,721,409 | 10/1955 | Bland | 296/97.5 |
| 3,026,999 | 3/1962 | Constantino | 224/312 |
| 3,430,299 | 3/1969 | Copen | 224/312 |
| 3,809,428 | 5/1974 | Cohen | 224/312 |
| 4,794,715 | 1/1989 | Cherwin . | |
| 5,024,479 | 6/1991 | Bryngelson . | |
| 5,392,549 | 2/1995 | Castro . | |
| 5,402,924 | 4/1995 | Gilson . | |
| 5,429,335 | 7/1995 | Cunningham . | |
| 5,454,616 | 10/1995 | Aymerich et al. | 296/97.1 |
| 5,490,708 | 2/1996 | Lee . | |
| 5,516,018 | 5/1996 | Eskandry . | |

FOREIGN PATENT DOCUMENTS

| | | | |
|---|---|---|---|
| 456574 | 11/1991 | European Pat. Off. | 224/312 |
| 2810469 | 9/1979 | Germany | 224/312 |

*Primary Examiner*—Joseph D. Pape
*Assistant Examiner*—Kiran Patel
*Attorney, Agent, or Firm*—Brooks & Kushman PC

[57] ABSTRACT

A sun visor assembly comprises a visor body and an article-holding assembly. The visor body has a concealed hollow, a core and an exterior surface. The article-holding assembly includes an O-ring connected to the core of the visor body within the hollow, and a substantially non-elastic strap having one portion retractably connected to the O-ring and another portion overlaying the exterior surface of the visor body. The O-ring sufficiently yieldably tightens the strap to store articles between the strap and the exterior surface of the visor body.

4 Claims, 2 Drawing Sheets

SUN VISOR WITH RETRACTABLE ARTICLE-HOLDING ASSEMBLY

TECHNICAL FIELD

This invention relates to a sun visor having an article-holding assembly which includes a mechanical retracting device.

BACKGROUND ART

It is known to equip motor vehicle sun visors with an elastic strap for holding various items. U.S. Pat. No. 5,429,335, for example, shows an article-holding assembly which includes an elastic strap and a means to mount the strap to the exterior of the sun visor. However, the elastic straps in such article-holding assemblies typically lose a substantial amount of their elasticity during use, and become ill-suited for their intended purpose. In addition, the means for mounting the strap to the sun visor is normally visible on the exterior of the visor.

Other prior sun visor article-holding assemblies include non-elastic straps. Such article-holding assemblies, however, do not sufficiently hold objects in place because the non-elastic straps are typically not held in sufficient tension. Furthermore, such article-holding assemblies offer little range of expansion to store larger objects. Finally, the non-elastic straps tend to take on some type of permanent set under use conditions.

SUMMARY OF THE INVENTION

The invention is a sun visor assembly comprising a visor body having a concealed hollow, a core and an exterior surface; and an article-holding subassembly and a retracting device disposed within the hollow and connected to the visor core. The article-holding subassembly further comprises a substantially nonelastic strap having one portion retractably connected to the retracting device and another portion overlaying the exterior surface of the visor body. The retracting device sufficiently yieldably tightens the strap to store articles between the strap and the exterior surface of the visor body.

Accordingly, it is an object of the invention to provide a sun visor assembly including an article-holding subassembly which can sufficiently hold articles in place even after extended use.

It is another object of the invention to provide a sun visor assembly including an article-holding subassembly which can expand to accommodate varying sized articles.

Still another object of the invention is to provide a sun visor assembly including an article-holding subassembly having a strap and a retracting device, wherein the retracting device is concealable within a visor core of the sun visor assembly.

These and other objects, features and advantages of the invention are readily apparent from the following detailed description of the best mode for carrying out the invention when taken in conjunction with the accompanying drawings.

BEST MODES FOR CARRYING OUT THE INVENTION

Figure 1:
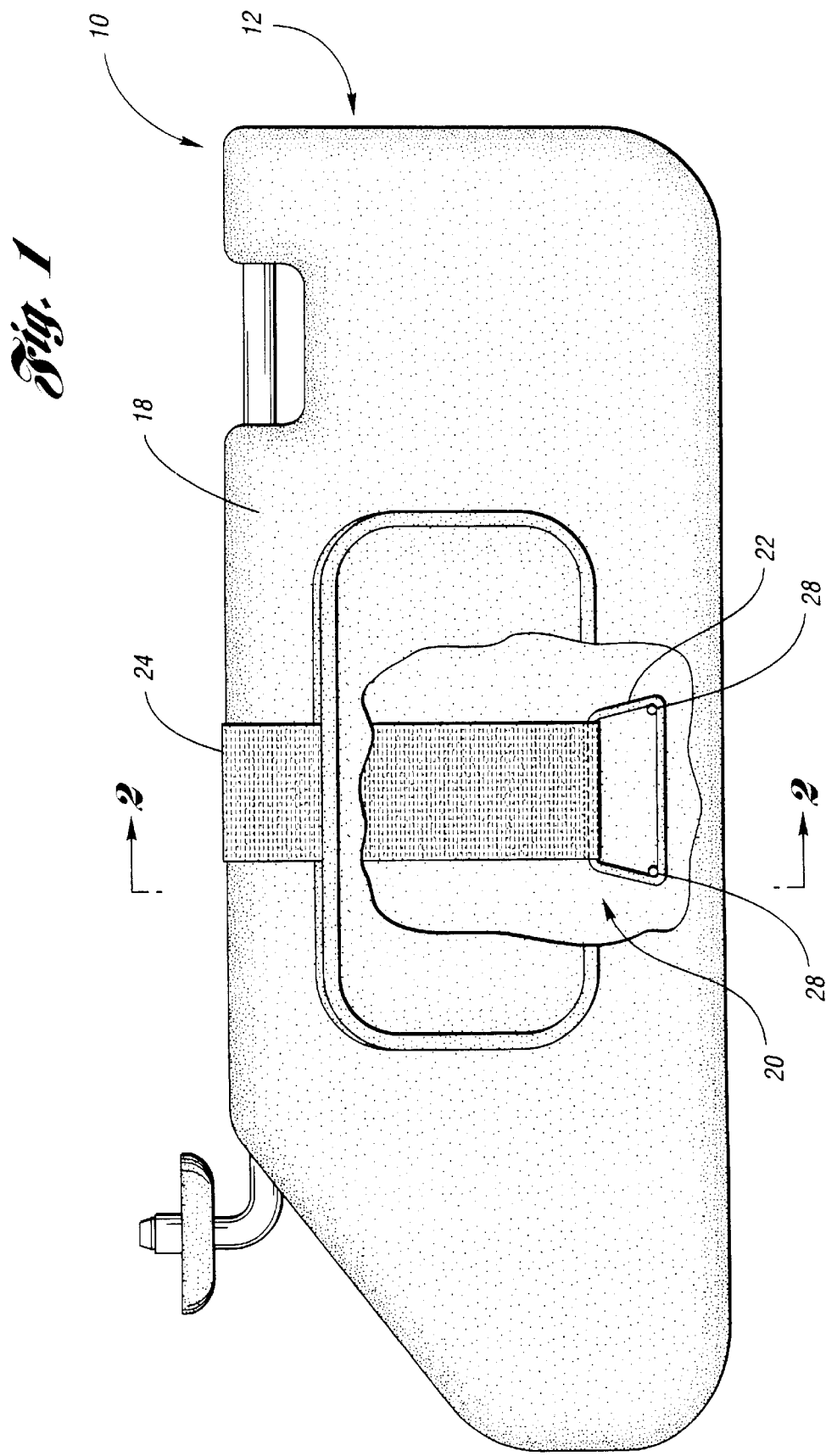
FIG. 1 is a front-elevational view of a first embodiment of a sun visor assembly according to the invention partially broken away to show an article-holding subassembly.
Figures 2, 3:
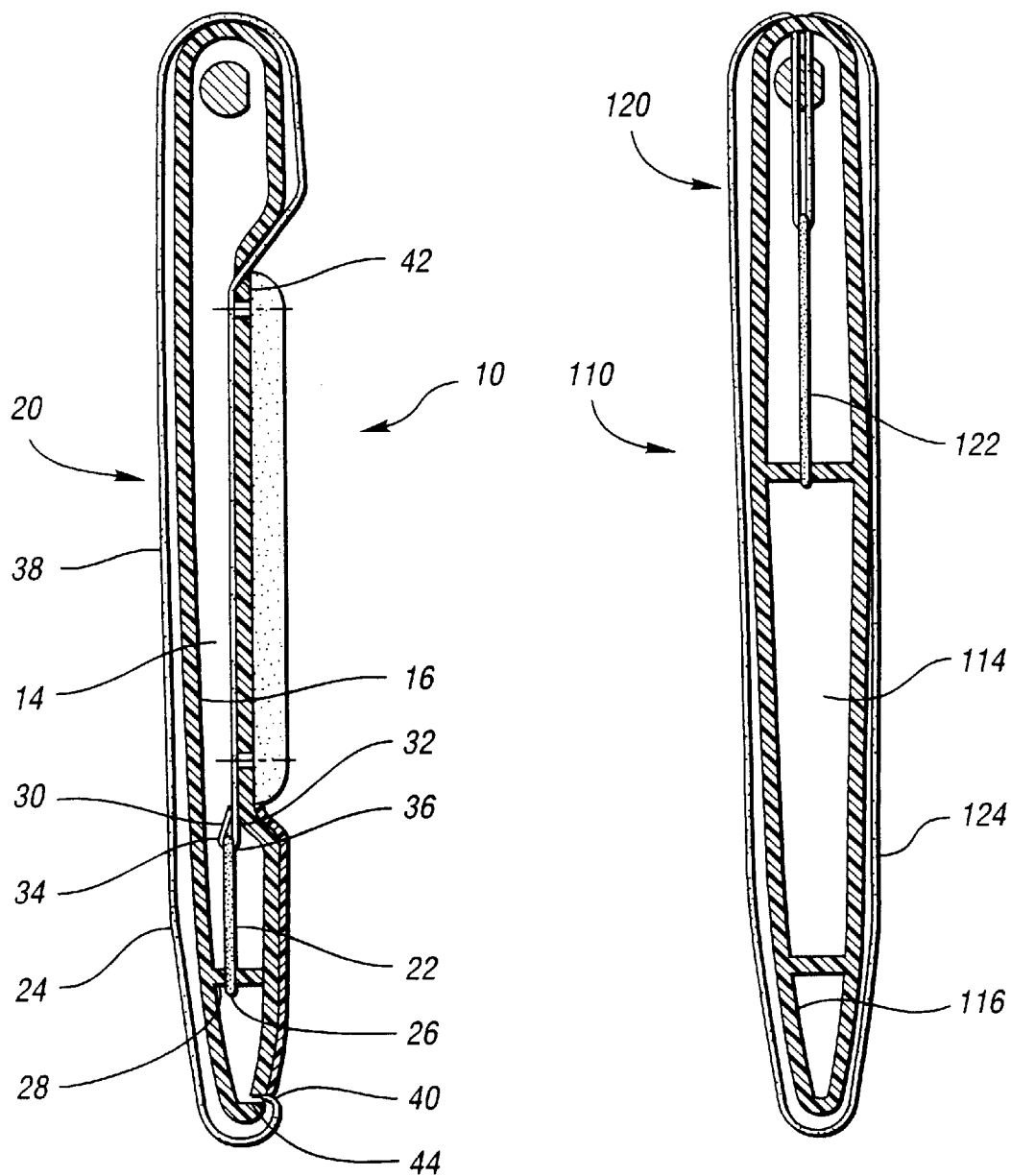
FIG. 2 is a cross-sectional view of the sun visor assembly taken on line 2—2 of FIG. 1, and showing the article-holding subassembly.
FIG. 3 is a cross-sectional view of a second embodiment of the sun visor assembly according to the invention.

With reference to the drawings, the preferred embodiments of the invention will be described. FIGS. 1 and 2 show a first embodiment 10 of a sun visor assembly according to the invention. The sun visor assembly 10 includes a visor body 12 having a vanity mirror 13, a concealed hollow 14, a core 16 and a covering or exterior surface 18; and an article-holding subassembly 20. The article-holding subassembly 20 is used to hold articles, such as maps or sun glasses, securely against the exterior surface 18 of the visor body 12.

The article-holding subassembly 20 comprises a retracting device 22 and a map strap 24. In the preferred embodiment, the retracting device 22 comprises an elastic O-ring, but it should he appreciated that the retracting device may be any other suitable device such as a c oil spring, a resilient bow-shaped spring, a torsion bar, or a spring loaded spool similar to a seat belt retractor which can provide a tensile force to the strap 24 while sufficiently maintaining its retractive characteristics. The O-ring 22 is disposed within the concealed hollow 14 of the visor body 12, and has a bottom portion or part 26 fixed to a pair of spaced projections or pegs 28 on the core 16 to spread the bottom part of the O-ring.

The strap 24 has a first end portion 30 which is folded and secured to an adjacent portion 32 of the strap to form a loop 34. The loop 34 is retractably connected to a top portion or part 36 of the O-ring 22. A middle portion 38 of the strap 24 extends from the hollow 14 to overlay the exterior surface 18 of the visor body 12 where the articles are to be held. A second end portion 40 of the strap 24 is affixed to the core 16 in any suitable manner. The strap 24 preferably comprises a substantially non-elastic material, such as nylon, rope or fabric, which can be pulled relatively tightly against the exterior surface 18 of the visor body 12 by the O-ring 22.

To assemble the sun visor assembly 10, the O-ring 22 is connected to the first end portion 30 of the strap 24 as previously described. While the visor body 12 is open to expose the hollow 14, the O-ring 22 is placed over the pegs 28 of the core 16. The second end portion 40 of the strap 24 is then fed from the hollow 14 behind the vanity mirror 13 through a slot 42 in the core 16. The visor body 12 may then be closed to conceal the O-ring 22. The strap 24 is then looped around the exterior surface 18 of the visor body 12, and the second end portion 40 of the strap is affixed to a slot 44 in the core 16 or trapped within the core when the visor body 12 is closed.

The article-holding subassembly 20 is configured such that the O-ring 22 provides a tensile force to the strap 24 to remove slack in the strap and to hold it tightly against the exterior surface 18 of the visor body 12. As t he strap 24 is pulled away from the exterior surface 18 of the visor body 12 to receive an article to be held, the O-ring 22 yields and is consequently stretched from its initial position. In its stretched condition, the O-ring 22 continues to provide a tensile force to the strap 24, thereby enabling articles to be securely stored between the strap and the exterior surface 18 of the visor body 12. Once the articles are removed from the sun visor assembly 10, the O-ring 22 returns to its initial position as shown in FIG. 2, and the strap 24 is once again pulled tightly against the exterior surface 18 of the visor body 12.

Because the O-ring 22 maintains its retractive or elastic characteristics over a prolonged time, the article-holding subassembly 20 is able to sufficiently hold articles against the exterior surface 18 of the visor body 12 even after extended use. Furthermore, because the O-ring 22 has a relatively high coefficient of elasticity, the article-holding subassembly 20 is able to easily accommodate varying sized articles. Finally, because the O-ring 22 is concealed within the hollow 14 of the visor body 12, the sun visor assembly 10 has an attractive appearance.

FIG. 3 shows a second embodiment 110 of the sun visor assembly including an article-holding subassembly 120. In this embodiment, the article-holding subassembly 120 has a continuous or endless loop strap 124 which does not have a portion affixed to a core 116. The continuous loop strap 124 is connected to an O-ring 122, or other suitable retracting device, and the O-ring is affixed to projections or pegs 128 in a concealable hollow 114 of the core 116 in a manner similar to that previously described.

The invention has been described in an illustrative manner, and it is to be understood that the terminology which has been used is intended to be in the nature of words of description rather than of limitation. Obviously, many modifications and variations of the invention are possible in light of the above teachings. It is, therefore, to be understood that within the scope of the appended claims, the invention may be practiced otherwise than as specifically described.

What is claimed is:

1. A sun visor assembly comprising:
   a visor body having a concealed hollow, a core and an exterior surface; and
   an article-holding subassembly including:
      a retracting device disposed within said hollow and connected to said core, and
      a substantially non-elastic strap having one portion retractably connected to said retracting device and another portion overlaying said exterior surface of said visor body,
      said retracting device sufficiently yieldably tightening said strap to store articles between said strap and said exterior surface of said visor body.

2. The sun visor assembly of claim 1 wherein said retracting device includes an O-ring.

3. The sun visor assembly of claim 1 wherein said strap has first and second ends, said first end is retractably connected to said retracting device and said second end is connected to said core of said visor body.

4. A sun visor assembly comprising:
   a visor body having a concealed hollow, a core and an exterior surface; and
   an article-holding subassembly including:
      an O-ring disposed within said hollow and having one part connected to said core, and
      a substantially non-elastic strap having one portion retractably connected to another part of said O-ring, and another portion of said strap overlaying said exterior surface of said visor body,
      said O-ring sufficiently yieldably tightening said strap to store articles between said strap and said exterior surface of said body.

* * * * *